C. F. PENN & F. P. RAND.
BORING MACHINE.
APPLICATION FILED NOV. 11, 1912.

1,081,552.

Patented Dec. 16, 1913.
2 SHEETS—SHEET 1.

Inventors
Charles F. Penn.
Frank P. Rand.

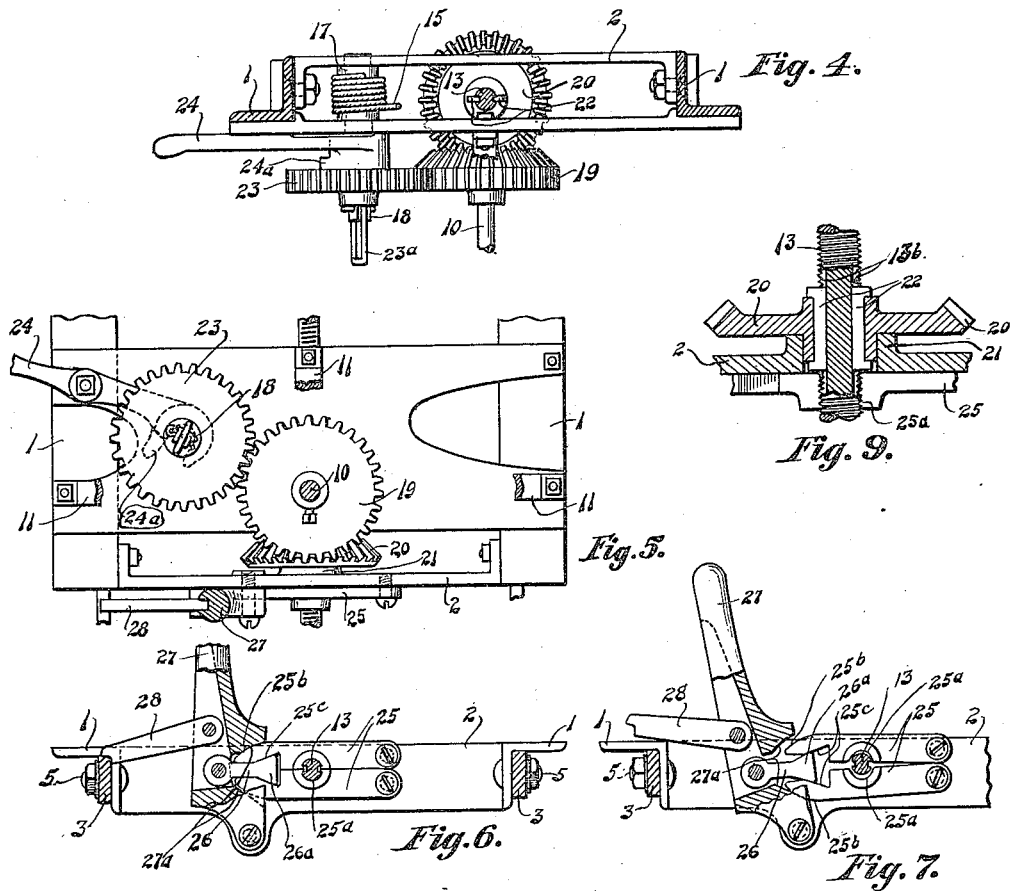
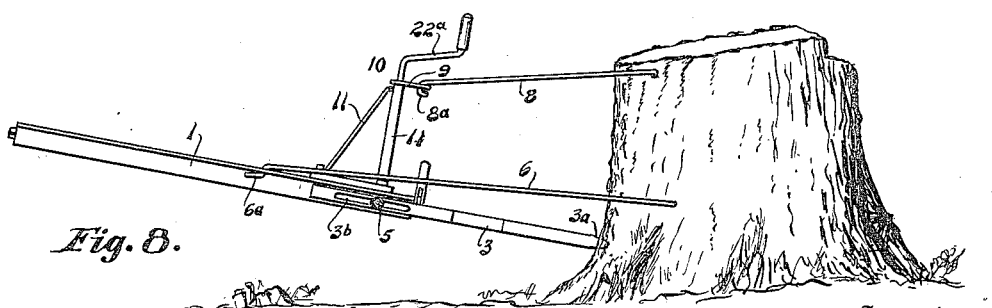

UNITED STATES PATENT OFFICE.

CHARLES F. PENN AND FRANK P. RAND, OF SPOKANE, WASHINGTON.

BORING-MACHINE.

1,081,552.  Specification of Letters Patent.  Patented Dec. 16, 1913.

Application filed November 11, 1912. Serial No. 730,588.

*To all whom it may concern:*

Be it known that we, CHARLES F. PENN and FRANK P. RAND, citizens of the United States, residing at Spokane, in the county of Spokane and State of Washington, have invented certain new and useful Improvements in Boring-Machines, of which the following is a specification.

Our invention relates to improvements in boring machines, the present embodiment of the invention being particularly designed and adapted for use as a stump boring machine for boring the vertically extending centrally located flue hole and the intersecting laterally extending draft and vent holes, one of the latter being adapted to receive and contain a "stump burner" of the character disclosed in Patent No. 1,002,752, issued to Frank P. Rand, September 5th, 1912.

The primary object of the invention is to provide a generally improved boring machine of this class adapted to be readily mounted upon and attached to the stump in either a vertical or laterally extending position for boring the vertical and lateral holes desired for use in connection with the burning of the stump as above referred to, and provided with improved auger actuating and withdrawing mechanism together with improved force feed or clutch mechanism adapted to start the auger and also force it through soft or decayed portions of the stump where the auger would not otherwise take hold without the use of such force feed mechanism.

With the above mentioned and other ends in view, the invention consists in the novel construction, arrangement, and combination of parts, hereinafter described, illustrated in one of its embodiments in the accompanying drawings, and particularly pointed out in the appended claims.

Figure 1:
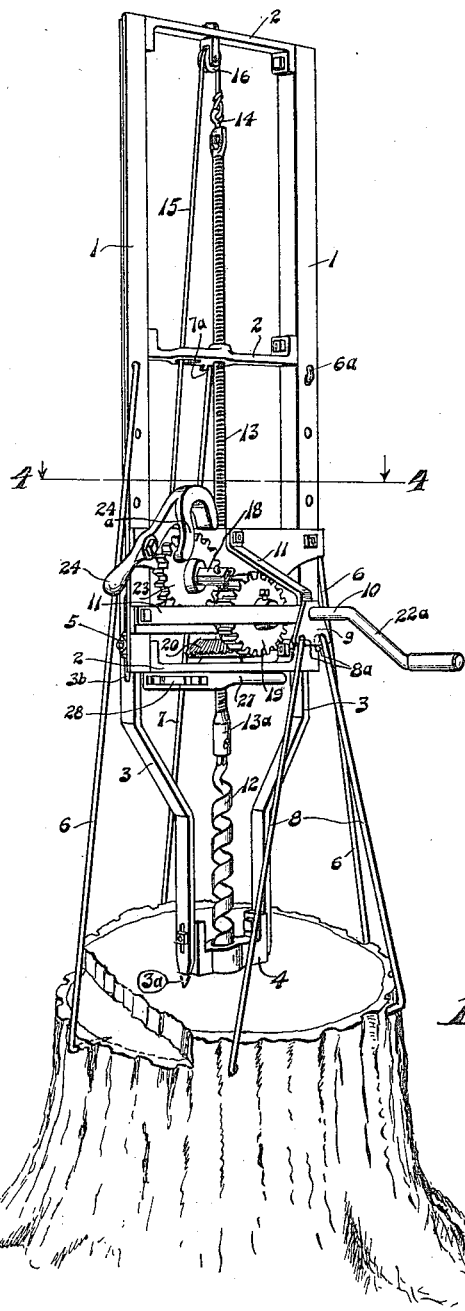
Figure 2:
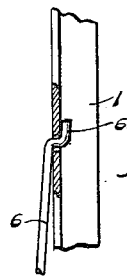
Figure 3:
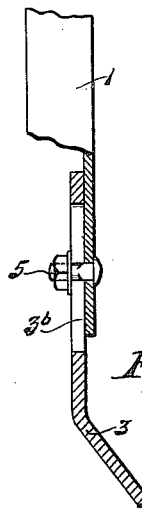

Referring to the drawings forming a part of this specification, Figure 1, is a perspective view of the improved boring machine in its initial boring position mounted upon and attached to a stump for boring a vertical centrally located hole in the latter, the force feed auger mechanism or clutch being in closed or operative position. Fig. 2, a detailed fragmentary view of one of the angle bar side members of the machine frame showing in detail the manner of attaching the upper ends of the frame supporting anchor rods to the side members of said machine frame. Fig. 3, a similar view, showing the adjustable connection between the supporting yoke members and the side members of the machine frame. Fig. 4, an enlarged cross sectional view of the machine frame taken on line 4—4 of Fig. 1, the auger actuating gear mechanism being shown in top plan and the auger elevating or withdrawing gear being in gear or mesh with the auger driving gear for actuating the cable winding spool or drum and thereby withdrawing or elevating the auger from the bored hole. Fig. 5, a front elevation of the auger actuating gear mechanism, the force feed auger mechanism being in closed or operative position. Fig. 6, a view of the under or bottom side of the machine frame, the forced feed auger or clutch mechanism being partly in section for the purpose of clearer illustration of the parts. Fig. 7, a similar view, the parts of the force feed or clutch mechanism being shown in released position. Fig. 8, an outline view of the improved boring machine mounted upon and attached to a stump for boring one of the side or lateral holes in the stump to intersect the first bored or centrally located draft hole or flue above referred to. Fig. 9, a detailed central sectional view of the threaded auger driving spindle or shaft and the actuating gear together with the intermediate connections.

Similar numerals of reference designate like parts throughout all the figures of the drawings.

The improved boring machine comprises a main frame made up, in the present instance, of angle bar side member 1, connected by means of cross members 2, bolted or otherwise suitably secured thereto.

The main frame is provided with an adjustably mounted supporting yoke consisting, in the present instance, of supporting side members 3, terminating in anchor points 3ª, adapted to be driven into the stump or other material being operated upon, the lower ends of said side or yoke members 3, being provided with an adjustably mounted auger guide head 4, and the upper ends of said side members being provided with guide slots 3ᵇ, adapted to receive and contain adjusting bolts 5, carried by the lower ends of said side members 1, of the main frame.

As a means for supporting and anchoring the machine frame in any desired position, as for example,—in a vertical position as shown in Fig. 1, or in a lateral or horizontally extending position as shown in Fig. 8, brace or anchor rods 6, 7, and 8, are provided, the upper ends of the side rods 6, being bent as at 6ª, to extend through holes, or openings in the angle bar members 1, and the rear rod 7, being bent as at 7ª, to extend through the intermediate cross member 2, and the front rods 8, being bent as at 8ª to extend through a bearing plate 9, supporting the crank shaft 10, through the medium of brace or bracket arms 11. As a means for securing the lower ends of the rods 6, 7, and 8, to the stump or other material being operated upon, the lower ends of said rods are pointed and bent at right angles whereby said pointed angular extending portions may be driven into the stump or material in an obvious manner.

As a means for revolving or driving the auger 12, and giving the same a forced feed when desired, as well as for withdrawing the same from the bored hole, a longitudinally movable threaded auger driving spindle or shaft 13, is provided, said threaded spindle being provided at its lower end with a chuck 13ª, to receive and contain the shank portion of the auger, and at its upper end with a swivel member 14, connected to a cord or cable 15, the latter passing over a pulley 16, at the upper end of the main frame and thence downwardly and connected to a winding spool 17, (see Fig. 4) carried upon a gear shaft 18, which latter is operated, as hereinafter described.

As a means for driving the auger spindle or shaft 13, the crank shaft 10, is provided with a compound or bevel-spur gear 19, meshing with a second bevel gear 20, mounted in a bearing opening 21, (see Fig. 9) of the lower cross member 2. As a means for permitting the longitudinal movement of the spindle or shaft 13, during the revolution of the latter, the gear 19, is provided with oppositely arranged key or guide members 22, seated in oppositely arranged guideways or grooves 13ᵇ, of the auger driving spindle or shaft 13, the shaft 10, being adapted to be operated, in the present instance, by means of a crank 22ª.

The gear shaft 18, carrying the cable winding member 17, is provided with a longitudinally movable gear 23, the latter being retained in the position shown in Fig. 1, by means of an arm 24ª, of a gear shifting lever 24, and when it is desired to elevate or withdraw the auger driving spindle or shaft 13, and the auger carried by the latter from the hole being bored, the lever member 24, may be elevated whereby the arm 24ª, will clear the gear 23, and the latter may be shifted forwardly upon the angular portion of the shaft 18, through the medium of the loop member 23ª, thereby bringing the gear 23, into mesh with the spur gears of the gear 19, after which the lever member 24, may be dropped down at the rear of the gear 23, as shown in Figs. 4 and 5, whereby the continued movement of the crank 22ª, and the crank shaft and driving mechanism will actuate the gear 23, and winding spool or member 17, thereby elevating or withdrawing the auger spindle or shaft 13, and auger carried thereby, in an obvious manner and to its initial position, as indicated in Fig. 1.

As a means for giving the auger 12, a force feed, as in passing through soft wood or decayed portions thereof, an auger force feed or clutch mechanism is provided at the lower end of the frame, said force feed or clutch mechanism consisting, in the present instance, of a pair of pivotally mounted clutch members 25, secured beneath the lower cross member 2, of the frame, said clutch members being provided with threaded portions 25ª, adapted to be brought into operative contact with the spindle or shaft 13, as shown in Fig. 6, for the force feed operation of the latter, as shown in Fig. 6, or to be thrown out of contact or engagement with the spindle or shaft 13, as shown in Fig. 7, for the ordinary operation of the auger or for the withdrawal of the auger and spindle shaft 13, as hereinbefore explained. As a means for positively opening or closing said clutch members 25, the free ends of the latter are provided with beveled portions 25ᵇ, and notched portions 25ᶜ, on the inner sides, said notched portions 25ᶜ, being adapted to receive and contain an intermediate pivoted actuating member 26, said actuating member 26, being provided with a beveled or wedge-shaped portion 26ª, said actuating member 26, being pivotally connected to an operating handle 27, whereby by forcing the handle 27, into one direction, the notched or socket portion 27ª, of the handle will come into engagement with the beveled portions 25ᵇ, of the free ends of the clutch members 25, and force the latter together as shown in Fig. 6, the parts being held in such locked or feeding position of the feed clutch mechanism by means of a latch member 28, adapted to engage with the adjacent side yoke member 3, as shown in Fig. 6, of the drawings.

When it is desired to move the clutch members 25, out of contact with the threaded spindle or shaft 13, for releasing the latter, the handle 27, is moved to a reversed position after disengagement of the latch member 28, whereby the wedge-shaped portion 26ª, of the member 26, by contact with the notched portions 25ᶜ, of the clutch members will move the free ends of the latter outwardly or away from each other, as illustrated most clearly in Fig. 7, of the drawings.

From the foregoing description, taken in connection with the accompanying drawings, the operation and advantages of our invention will be readily understood.

Having thus described one of the embodiments of our invention, what we claim and desire to secure by Letters Patent is,—

1. In a boring machine, a main frame, brace anchor rods detachably connected thereto, a supporting yoke adjustably secured to the lower end of said main frame and terminating in anchor points, and an adjustable auger guide-head carried by said yoke in proximity to said anchor points.

2. In a boring machine, a main frame, a supporting yoke adjustably and detachably connected thereto and provided at its lower end with anchor-points, and an adjustable auger guide-head carried by said yoke in proximity to said anchor points.

3. In a boring machine, a main frame consisting of side members and cross members, and an adjustably mounted supporting yoke secured to the side members of said main frame and consisting of supporting side members terminating in anchor points adapted to be driven into the article to be operated upon, and an auger guide head adjustably secured to said side members in proximity to said anchor points.

In testimony whereof we have affixed our signatures in presence of two witnesses.

CHARLES F. PENN.
FRANK P. RAND.

Witnesses:
L. OBERG,
R. L. RIGGINS.

Copies of this patent may be obtained for five cents each, by addressing the "Commissioner of Patents, Washington, D. C."